Patented Nov. 7, 1922.

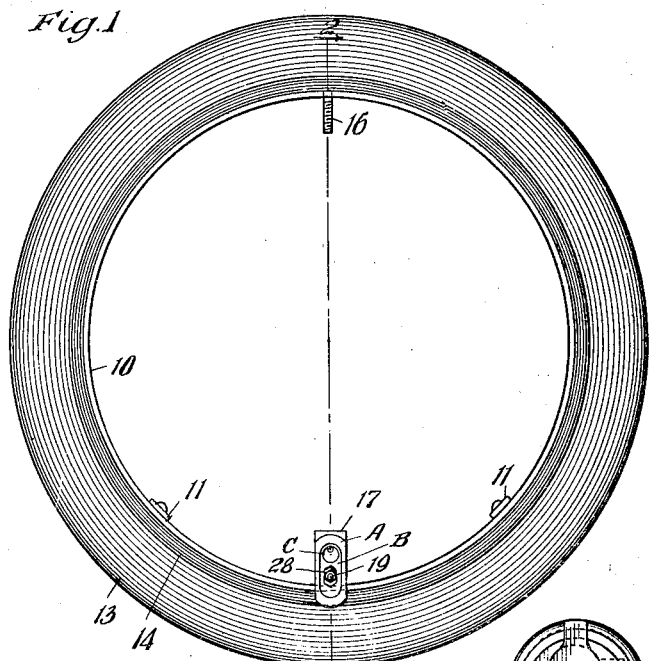
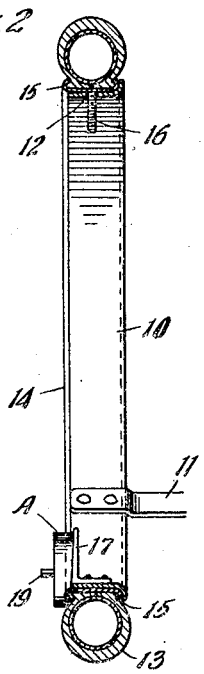
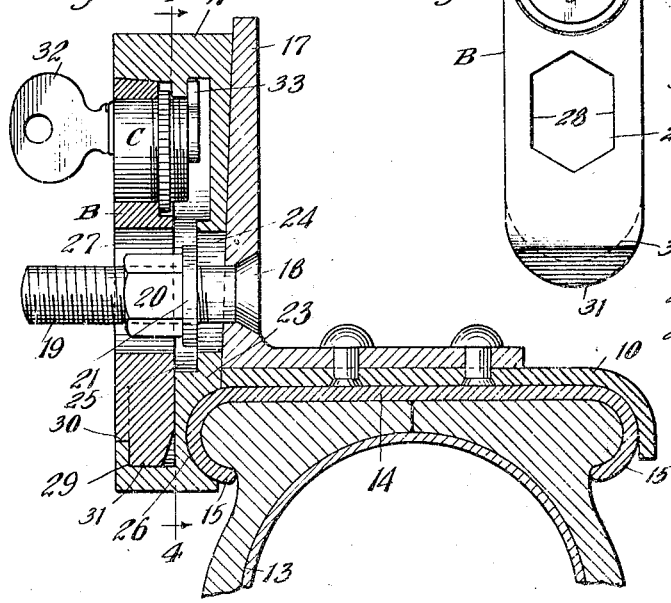
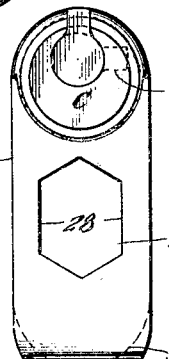
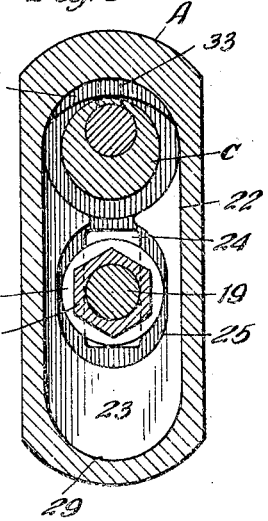

1,434,492

UNITED STATES PATENT OFFICE.

RAY W. JOHNSON, OF CHICAGO, ILLINOIS.

ANTITHEFT SPARE-TIRE DEVICE.

Application filed May 31, 1921. Serial No. 473,797.

*To all whom it may concern:*

Be it known that I, RAY W. JOHNSON, a citizen of the United States, residing at Chicago, in the county of Cook and State of Illinois, have invented a certain new and useful Improvement in Antitheft Spare-Tire Devices, of which the following is a full, clear, concise, and exact description, reference being had to the accompanying drawings, forming a part of this specification.

This invention relates to improvements in anti-theft spare tire device.

It is a common practice for automobilists to carry a complete spare tire and detachable rim ready to be placed on a wheel in the event of puncture of a tire in use, such spare tire being generally mounted on an extra or dummy main rim permanently secured in place on the rear of the automobile body. Much annoyance and many losses are very frequently occasioned by the theft of such spare tires, particularly in large cities, when the automobile is left standing unprotected for any length of time.

The object of my invention is to provide a relatively inexpensive, simple, and thoroughly effective device which will prevent the unauthorized removal of a spare tire from its usual mounting on an extra or dummy rim permanently secured to the automobile body.

A specific object of my invention is to provide a device of the character indicated in the preceding paragraph which will be adaptable for any commonly used securing bolt regardless of its length and, furthermore, the device can only be released or removed by means of a particular key in possession of the automobile owner.

Other objects of the invention will more clearly appear from the description and claims hereinafter following.

In the drawing forming a part of this specification, Fig. 1 is an elevational view of a spare tire mounted in the customary manner on an extra or dummy rim permanently secured to the back or other suitable part of an automobile body and illustrating my invention in connection therewith. Fig. 2 is a vertical sectional view corresponding to the section line 2—2 of Fig. 1. Fig. 3 is an enlarged sectional view taken through the antitheft device and parts immediately adjacent thereto to better illustrate the invention. Fig. 4 is a vertical sectional view corresponding substantially to the section line 4—4 of Fig. 3. And Fig. 5 is an inside elevation of the locking plate detached.

In said drawing, 10 denotes a spare or dummy main rim or support which is permanently secured to the rear or other suitable part of the automobile body by any suitable means such as the plates 11—11 in such a way as to positively prevent removal of said rim 10 from the car body without the aid of special tools and destroying some part. As customary, the rim 10 will be so positioned that the opening for the tire valve will be at the top as indicated at 12. A tire is indicated at 13, the same being of well known form and the same is mounted upon a so-called demountable rim 14 which, as will be understood, is adapted to cooperate with a rim on one of the automobile wheels having the same general characteristics as the spare rim 10. The demountable rim 14, as shown, has out-turned rounded annular flanges 15—15, one at each side. The complete spare tire, including the tire proper and demountable rim 14, is applied to the spare main rim 10 in the manner shown in Fig. 1, that is, with the valve 16 of the tire extending through the valve opening 12 in said rim 10.

The complete tire is held in position against malicious removal by the following means. Secured to said rim or support 10 at the bottom thereof by riveting or other suitable permanent fastening means, is an upstanding heavy flange 17 to which is preferably permanently and rigidly secured a countersunk bolt 18, the shank 19 of which extends outwardly therefrom. In actual practice, it is found that these bolts vary greatly in length on different automobiles, some shanks being relatively short and others relatively long. Said shank is adapted to receive a hexagonal nut 20 thereon of common form, the nut shown having also an annular flange 21 at its base, which also is of common occurrence.

The anti-theft device proper comprises, broadly, a base member A; a locking plate B; and a lock C.

The base member A is preferably in the form of a casting of suitable heavy construction. The same is recessed on its outer side as indicated at 22 to provide a vertically elongated opening or pocket within which is received the correspondingly shaped plate B. The back wall 23 of the base member A is provided with a vertically elongated slot 24 of a width corresponding to the diameter of the usual bolt shank encountered. In addition, the back wall is preferably cut away as indicated at 25 to provide a wider recess and one which is also vertically elongated to accommodate the nut flange 21 whenever the same is used. With this arrangement, it will be evident that, by screwing down the nut 20, the base member A is held tightly and rigidly against the flange 17. At its bottom, the base member A is extended downwardly so as to overlap the adjacent edge 15 of the demountable rim and is curved as indicated at 26 to fit said rim. It will be understood that this portion of the construction may be varied to conform to demountable rims of different types.

The locking plate B is also of heavy construction and shaped to fit within the recess 22 of the base member A so that the outer face of the plate B will preferably lie flush with the outer face of the base member A. The locking plate B is provided with a recess 27 extending completely therethrough and adapted to be positioned over the recess 24 of the base member A. Said recess 27 has parallel side walls 28—28 and is vertically elongated so as to accommodate the nut 20 therein when two of the faces of the latter are parallel to the faces 28. With this arrangement, it is evident that the nut 20 will be held by the locking plate B against rotation and, furthermore, the plate B will overlap the flange 21 of the nut when such flange is used. It will be observed also that it is immaterial how long the shank 19 of the bolt is since it does or may project entirely through the locking plate B. This is of importance in a device of the character disclosed since it makes my improvement universally usable regardless of the different lengths of securing bolts 19 encountered in actual practice. By vertically elongating the openings 27 and 24, it is evident that vertical adjustment of the locking device is allowed in order to accommodate it to varying conditions encountered in actual practice.

The locking plate B is held in operative position by the following means. The bottom portion of the base member A is provided with an arcuate undercut recess 29 and the lower end of the plate B is correspondingly cut away on the line indicated at 30 in Fig. 5 so as to adapt the extreme lower edge 31 of the plate B engaging in the recess 29 and thus interlocking the lower ends of the plate B and base member A. At its upper end the lock plate B is provided with a barrel lock C, the one shown being of well known design. Said lock is adapted to be operated by a key 32 in a well known manner. The turn bolt of the lock is provided at its inner end beyond the barrel of the lock with a radially extended lug 33 which is adapted to be rotated through substantially a complete arc of 360°. The axis of rotation of the turn bolt is eccentric with respect to the axis of the barrel of the lock so that, when said lug 33 is in full line position shown in Figs. 3 and 5, it is adapted to engage under a crescent shaped flange 34 formed in base member A. When rotated to an unlocked position, said lug 33 is adapted to assume a position such as shown by the dotted lines 33$^a$ in Fig. 5 which thereby releases the upper end of the plate B.

From the preceding description, it will be seen that when the locking plate B is in position and the lug of the lock proper engaged under the flange 34, the plate B cannot be removed or pulled outwardly and is, of course, prevented from being twisted or rotated with respect to the member A by reason of the fact that it is countersunk within the recess 22. The nut 20, being held against rotation by the plate B cannot be unscrewed even though visible and hence the automobile tire and associated rim are maintained in place against surreptitious removal. In this connection it is to be understood that the valve 16 at the upper portion of the tire prevents the demountable rim and tire from being removed at the top of the support 10.

I have herein shown and described what I now consider the preferred manner of carrying out the invention, but the same is merely illustrative and I contemplate all changes and modifications that come within the scope of the claims appended hereto.

I claim:

1. In an anti-theft device for a tire and associated demountable rim mounted on a support having a securing bolt, and a nut adapted to be threaded upon the bolt; the combination with a base member having a portion adapted to engage an edge of the demountable rim, said member having an opening therethrough to accommodate the shank of the bolt; of a locking plate member having an opening therein through which the bolt is adapted to extend outwardly an unlimited distance; and within which the nut is received and held against rotation with respect thereto, one of said members having an upstanding wall surrounding and spaced from the edge of the opening therein, whereby a seat is provided to accommodate the other member, the latter being shaped to fit within said seat and to engage said upstanding wall, whereby said members when assembled are prevented from relative shifting movement transversely of the bolt shank; and means for securing said locking plate member rigidly in position on the base member.

2. In a device of the character described, the combination with a base member recessed on one side and provided with an opening through one wall thereof, and through which opening a bolt shank is adapted to be passed, said base member being adapted to be rigidly secured to a support by means of a nut screwed down on said shank against said wall; of a locking plate adapted to be fitted substantially flush within and occupy said recess, said locking plate having an opening therethrough alined with said opening of the base member, said opening permitting passage of an extended bolt shank therethrough but of a shape adapted to engage opposed faces of said nut and prevent the latter from turning within said opening, said locking plate and base member having inter-engaging portions for detachably inter-locking said plate and base member when the plate is within said recess; and a key operated lock mounted on said locking plate by which the latter is adapted to be detachably fastened to the base member within said recess.

3. In a device of the character described, the combination with a base member having a recess formed on the outer side thereof, the wall of said member at the bottom of the recess having an opening extending therethrough to accommodate a bolt shank, said opening being elongated to provide for variations in the position of the base member, said base member being adapted to be rigidly secured to a support by means of a nut screwed down on said shank against said wall, the recess being wider than the nut and adapted to accommodate the nut flange; of a locking plate corresponding in outline to said recess and adapted to be inserted therewithin, said locking plate having also an opening therethrough alined with said opening of the base member and also elongated, said opening permitting passage of an extended bolt shank therethrough, and of a width to accommodate said nut but prevent the latter from turning within said opening of the locking plate; and means, including a key-operated lock, carried by said plate for rigidly but detachably locking said plate to the base member.

4. In a device of the character described, the combination with a base member having a recess formed on the outer side thereof, the wall of said member at the bottom of the recess having an opening extending therethrough to accommodate a bolt shank, said opening being elongated to provide for variations in the position of the base member, said base member being adapted to be rigidly secured to a support by means of a nut screwed down on said shank against said wall, the recess being wider than the nut; of a locking plate corresponding in outline to said recess and adapted to be inserted therewithin, said locking plate having also an unobstructed opening therethrough alined with said opening of the base member and also elongated, said opening permitting passage of an extended bolt shank entirely therethrough and of a width to accommodate said nut, but preventing the latter from turning within said opening of the locking plate; and means, including a key-operated lock, for rigidly, but detachably locking said plate to the base member.

In witness that I claim the foregoing I have hereunto subscribed my name this 27th day of May, 1921.

RAY W. JOHNSON.

Witnesses:
CARRIE GAILING,
ANN BAKER.